Figure 1:
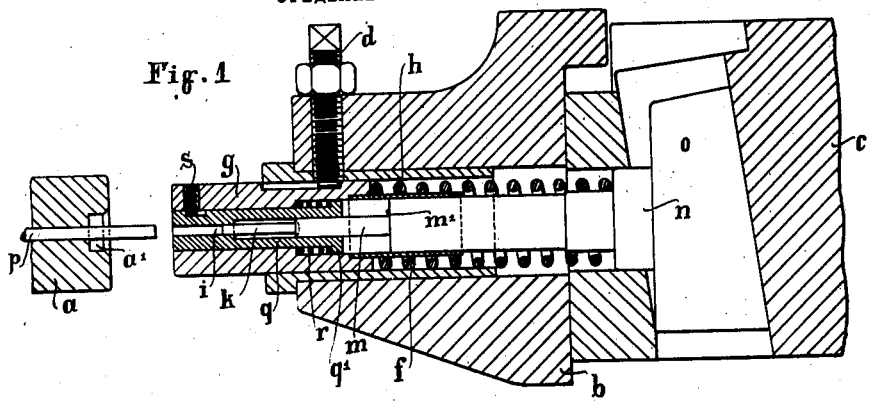

Feb. 22, 1927. 1,618,446
J. KUHNE
METHOD OF MAKING COLD SCREW BLANKS, RIVETS, AND SIMILAR HEADED ARTICLES
Original Filed Jan. 28, 1924

INVENTOR.
Joseph Kuhne
BY
ATTORNEY.

Patented Feb. 22, 1927.

1,618,446

UNITED STATES PATENT OFFICE.

JOSEPH KUHNE, OF ISERLOHN, GERMANY.

METHOD OF MAKING COLD SCREW BLANKS, RIVETS, AND SIMILAR HEADED ARTICLES.

Original application filed January 28, 1924, Serial No. 689,201, Patent No. 1,561,863, and in Germany June 26, 1922. Divided and this application filed February 28, 1925. Serial No. 12,377.

This application is divisional of my co-pending application No. 689,201, filed January 28, 1924, now Patent No. 1,561,863, dated November 17, 1925.

The subject-matter of my invention is a method of manufacturing the cold rivets, screw-blanks and other bolt-like, headed articles by means of which a very great length of the stock or rod can be upset to form the head so that the size of the head for a certain diameter of material is almost unlimited, the new method being thus especially adapted for producing voluminous heads, i. e. heads the volume of which equals to the volume of a portion of the rod or stock whose length is a multiple of the diameter of the rod.

The essential feature of my invention consists in this, that the end of the stock or rod is worked up into the form of a head by the application of a single, continuous pressure effected in this way. The rod end to be upset is first of all surrounded by a sleeve or hollow plunger and then, by the application of pressure only on the cross-section of the rod, is pressed out of the sleeve and into the head-forming mould or die space, wherein the mass of the rod-end becomes spread out or upset. Immediately on this but during the same pressure movement the head is pressed into its final shape by pressure exerted on the entire face of the head. Both the preliminary and final pressures are effected during a single stroke of the press, the preliminary pressure by means of a punch guided in the plunger surrounding the rod-end, and the final pressure being exerted commonly by the said punch and by said plunger, which two after pressing the rod-end into the mould for the head are positively coupled together and then together constitute the finishing stamping die. The entire procedure of forming the head therefore has an uninterrupted course and occurs during quite a short period, whereby the rod material flows in a satisfactory manner and detrimental structural changes and stresses are avoided. In consequence, the products of the new method have a high degree of strength, and annealing of the same is unnecessary. The new method, moreover, has the advantage of a high rate of production since at each pressure movement or stroke a finished article is produced. Furthermore the operating appliances, i. e. the mould and stamping die remain almost cold. These appliances are consequently subjected only to comparatively little wear. At the same time it is possible to increase the speed of operation of the machine and therefore the output. Finally, only a comparatively simple machine, namely, a so-called single pressure press, is necessary for carrying out the new method.

Another feature of my invention consists of this that, after having spread out the rod end in the head-forming matrix, a small recess or depression is pressed into the front face of the bolt head, the bottom of said recess corresponding with the cross-section of the stock or rod. In this way the formation of a sharp edge or burr at the front face of the bolt head which otherwise may result from the mass of the stock flowing into the unavoidable intervening space between the preliminary pressure punch and the hollow plunger surrounding said punch and the stock to be upset, is avoided.

My new method is more fully explained in the following description, reference being made to the annexed drawing which shows, by way of example, a constructional form of apparatus for carrying out said method. In the drawing—

Figs. 1 to 4 are four sectional side elevations of an apparatus which may be used in a machine performance of my method.

Figure 2:
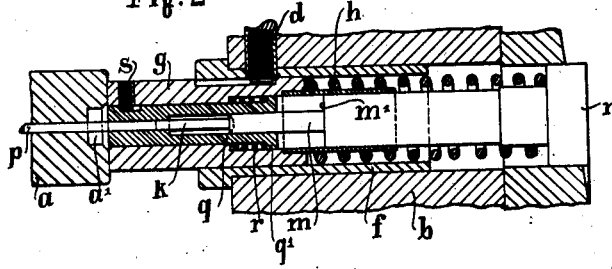
Figure 3:
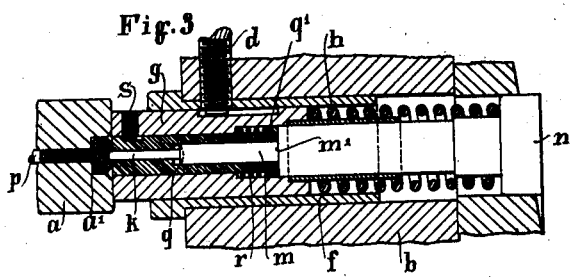
Figure 4:
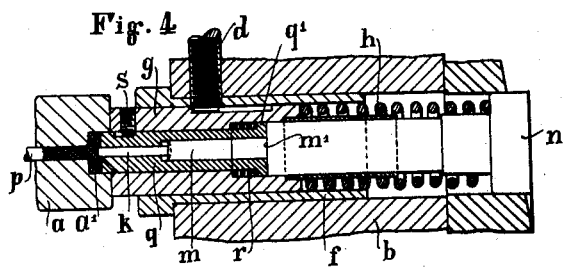

Fig. 1 indicates the position of the parts at the beginning of the pressure stroke, Figs. 2 and 3 indicate two intermediate positions, and Fig. 4 shows the position at the end of the pressure stroke.

Figure 5:
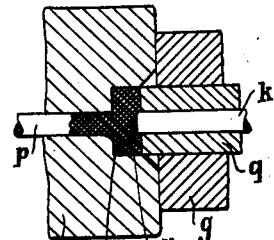
Figures 6, 7:
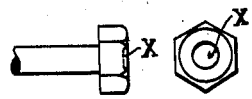

Fig. 5 is an axial, longitudinal section on a larger scale, of the matrix and the front end of the plunger surrounding the preliminary stamping punch in the end position of the pressure appliance, and Figs. 6 and 7 are side and front views, respectively, of a hexagon screw-head produced according to the present invention.

$a$ is a stationary die having a matrix $a^1$ of the size and shape of the head to be formed. This matrix is so sunk into the die $a$ that the final stamping die must enter the matrix in order completely to close the matrix. $b$ indicates the head of the reciprocating press-slide $c$, and $f$ a sleeeve exchangeably mounted in the head. In this sleeve is guided a second sleeve $g$ which is controlled by a spring $h$ tending to press it outwardly, its outward movement being arrested by the screw $d$ which engages in a groove of the sleeve $g$. In the sleeve $g$ is guided the hollow plunger $q$ which together with the pressure pin $k$ constitutes the final stamping die proper, and which is axially slidable in the sleeve $g$ within certain limits. The plunger $q$ is controlled by a compression spring $r$ which bears against its rear flange $q^1$ and against a shoulder on the sleeve $g$, said spring tending to force the plunger $q$ into the sleeve $g$. A screw $s$ engaging in a groove in the plunger $q$ limits this movement in such manner that in the normal position the pressure face of the plunger $q$ is flush with the front face of the sleeve $g$. The plunger $q$ has a bore $i$ of the diameter of the rod to be headed. In this bore is guided the pressure pin $k$ which at its rear end bears against the larger thrust rod $m$, the large end $n$ of the latter bearing against the adjustable key $o$ of the slide $c$. The thrust rod $m$ has a shoulder $m^1$ which, after a certain displacement of said thrust rod $m$ and pressure pin $k$ in the plunger $q$, strikes against the rear end of the latter and then drives the plunger $q$ positively.

The total length of the pressure pin $k$ and that portion of the thrust rod $m$ which is in front of the shoulder $m^1$ is so related to the length of the plunger $q$ that at the end of that movement, of the preliminary stamping punch formed by pin $k$ and rod $m$ which is independent of the plunger $q$, i. e. when the rod $m$, by means of its shoulder $m^1$, positively engages the plunger $q$, the front end of the pressure pin $k$ will project a certain distance from the plunger $q$.

The operation of the described apparatus is as follows:

After the rod $p$ to be headed has been fed through the die $a$ the distance corresponding to the mass of material to be shaped, the press-slide $c$ is moved leftwardly against the matrix $a$, the punch $q$ and the sleeve $g$ being slipped over the rod portion extending from the die $a$. As soon as sleeve $g$ abuts against the die $a$ the matrix or die chamber in the latter is closed or substantially closed laterally by this sleeve, while the plunger $q$ will not yet have entered said die space, so that this space, being enclosed by die $a$, sleeve $g$ and plunger $q$, has a greater depth than the intended finished height of the head to be upset (Fig. 2). By striking against the matrix $a$ the sleeve $g$ and with it the plunger $q$ are restrained from further movement while the slide $c$ and with it the rod $m$ and pressure pin $k$ advance with simultaneous compression of the spring $h$. During that time, the rod-portion projecting from the die $a$ and penetrating the bore $i$ in the plunger $q$ is pressed by the pressure pin $k$ into the die chamber or matrix $a^1$, the mass being spread out laterally all round in said space (Fig. 3). As soon as the mass is pressed into the matrix the thrust rod $m$ by means of its shoulder $m^1$, now located at the rear end of the plunger $q$, drives the latter forward while simultaneously compressing the spring $r$. In that way the plunger $q$ and pressure pin $k$, which both now act in common as a final stamping die and enter the die $a^1$ as such, completely spread and press out the mass in the matrix, that is, convert it to its final form. The slide $c$ thereupon again moves rightwardly, the plunger $q$ and sleeve $g$ returning to their initial positions by the action of springs $r$ and $h$ respectively (Fig. 1). Simultaneously means not shown in the drawing again advance the rod $p$ and cut off the finished article, whereupon the described operation is repeated.

When pressing that portion of the rod $p$ which is surrounded by the plunger $q$ into the matrix $a^1$ the pressure pin $k$ at its front end projects somewhat from the plunger $q$ (Figs. 3, 4 and 5) and it keeps this position with respect to the plunger $q$ also when the final pressing occurs. In that way, as Figs. 5-7 particularly show, a small recess or depression $x$ is pressed into the front face of the bolt head, the bottom of which recess corresponding with the cross section of the pressure pin. The extension i. e., flattening out, of the face of the work-piece associated with that action completely eliminates the sharp edge or burr which would have formed at the end of the rod $p$ adjacent to the pressure pin $k$ when the mass of this rod-end is pressed into the matrix, such formation being due to the mass flowing into the unavoidable intervening space between the pressure pin $k$ and the wall of the bore of the plunger $q$. The otherwise necessary extra work in removing the small annular burr from the front face of the bolt-head is thus dispensed with.

The new method and the machine for carrying it into practice may be modified in this way, namely, the rod to be headed, instead of being fed through the die $a$, may be conducted through an opening laterally of the latter. In this case the blank is cut off in a manner known per se before being worked up by the pressure devices. The blanks cut off are then introduced between die $a$ and plunger $q$ by means of a carrier of a form known per se, the plunger being advanced on to the blank, whereupon the pressing operations proceed in the manner already described.

The new step of pressing a deepening into the front face of the bolt head may be utilized, in the case of the heading of screws and the like, to form simultaneously on the front of the head either a slit for the insertion of a screw driver or a multiple sided hole for the insertion of a key. In the first instance the pressure pin $k$ has on its pressure face a projecting rib for forming the slit in the screw-head, while in the second instance the pressure pin $k$ and the bore of the plunger $q$ surrounding it have a polygonal cross section, the pressure pin $k$ projecting from the plunger a distance equivalent to the desired depth of the hole.

The advantages of my method over prior methods are, briefly stated, as follows: In making headed articles of the character set forth, two general processes are commonly employed. In one of these processes the stock is heated and upset while in a heated state. Articles so made possess the requisite strength, but the cost of manufacture is comparatively great because of the necessity of preliminarily heating the stock. In the other of these processes, commonly known as the cold process, the blank is upset in an unheated state in two stages, i. e., by successive upsetting or swaging actions. These actions are performed by a so-called "double-pressure press" in which, on one stroke of the press, a plunger acts to force an enclosed end of the blank projecting beyond the matrix back into the matrix to form inchoate head, and on a second stroke of the machine a second plunger acts to press the inchoate head into finished head shape. Such double-pressure presses, as heretofore constructed, are cumbersome and clumsy in construction, requiring the use of shifting means to successively dispose the plungers at different levels for working actions, they are slow in action because two working motions or cycles are required for the production of each article, and they are defective in operation because of an inherent fault due to the fact that a measurable time interval occurs in the action upon the blank of the two working punch members. When the first punch member exerts its working pressure on the blank a certain amount of heat is generated in the blank. I have discovered that this amount of heat is sufficient to cause the metal to flow readily under a succeeding pressure if the metal is acted upon before the heat comes to the surface, but that, unless the second pressure is immediately applied, the engendered heat passes to the surface of the blank and is given off, allowing the blank to chill and cool. This chilling or cooling of the blank is undesirable, for the reason that, if the second pressure is applied after chilling occurs, and the blank is again heated up by reason of this second pressure, molecular adjustments causing structural stresses occur making the formed head weaker than the body or shank of the bolt. Heads formed under such conditions very often break off upon a mere tap being given them, so that the additional and costly operation of annealing must be resorted to in order to produce bolts of proper strength. All prior double pressure presses with which I am familiar have this faulty action because of the time interval ensuing between the operation of the punches, the stock chilling and cooling off after the first pressure is applied to form the inchoate head and before the second pressure can be applied to complete or finish the head.

By the use of my method the expense of heating the blank prior to upsetting, as in the heat swaging process, and the above-noted objections to the cold swaging process heretofore in use, are wholly overcome. With my method, the instant the pressure stroke of the first pressure plunger $k$ is completed, the second pressure plunger $q$ comes into action, the two plungers then moving together as a unit coaxially, whereby immediately upon the formation of the inchoate head by the plunger $k$ the pressures of both plungers are applied over the full area of the inchoate head to flatten out the same into finished head form. The successive actions are so timed, and are so rapid, that before the heat in the inchoate head engendered by the stroke of plunger $k$ can come to the surface, and while the metal of the inchoate head is still therefore in a more or less fluent or plastic state, the plunger $q$ comes into action with the plunger $k$ and the forces of both plungers are applied at a time when the material will readily and easily flow from one formation into the other, so that no cooling or other undesirable structural changes in the material can take place during the time period of the formation of the complete head. Headed articles having superior strength are thereby produced from cold stock without annealing or other further treatment. Furthermore, my method, admitting of the use of plungers operating in the manner described, enables a type of machine to be employed for carrying the method into practice in which the plungers operate without time intervals between the cessation of action of one and the beginning of the action of the other, so that heads of maximum strength will be produced without additional treatment of the article and a complete article produced on each working stroke or cycle of action of the machine, the invention thus providing a method and lending itself to the production of a machine whereby the production rate per working time of the machine is materially increased and the cost of production accordingly reduced. Another advantage gained by my method is that the working action may be performed at such a rapid rate that each working action is completed before any active development of heat in the article, so that great working speed of the machine can be obtained without the tools becoming scorched or injured to any degree by heat.

Claims:

1. The process of upsetting or heading a blank for the formation of a headed article, such as a bolt, rivet, or the like, which consists in providing a die having a head forming chamber of suitable size and shape and open at its front, disposing the blank in the die so that one end of the blank projects beyond the open front of the chamber, enclosing the projecting end of the blank within suitable enclosing means, disposing the enclosing means so as to wholly or substantially close the front of the chamber at all sides about the blank, applying pressure to the enclosed projecting end of the blank in the axial line of the blank so as to force such projecting end of the blank from said enclosing means into the chamber in such manner as to laterally expand the same together with that portion of the blank normally contained in the chamber so as to form an inchoate head within the chamber, then while said pressure is acting applying a second pressure within an area about the same for coaction therewith so that the sum of the areas of both pressures will be equal to the full area of the inchoate head, and simultaneously exerting both pressures upon the inchoate head to flatten it out and form a complete head.

2. The process of upsetting or heading a blank for the formation of a headed article, such as a bolt, rivet, or the like, which consists in providing a die having a head forming chamber of suitable size and shape and open at its front, disposing the blank in the die so that one end of the blank projects beyond the open front of the chamber, enclosing the projecting end of the blank within suitable enclosing means, disposing the enclosing means so as to wholly or substantially close the front of the chamber at all sides about the blank, applying pressure to the enclosed projecting end of the blank in the axial line of the blank so as to force such projecting end of the blank from said enclosing means into the chamber in such manner as to laterally expand the same together with that portion of the blank normally contained in the chamber so as to form an inchoate head within the chamber, then while said pressure is acting applying a second pressure within an area about the same for coaction therewith so that the sum of the areas of both pressures will be equal to the full area of the inchoate head, simultaneously exerting both pressures upon the inchoate head to flatten it out and form a complete head, and extending the range of the first-named pressure beyond that of the second-named pressure so as to form a depression in the crown of the head.

In testimony whereof I affix my signature.

JOSEPH KUHNE.